United States Patent
Balasingh et al.

(10) Patent No.: US 10,045,379 B2
(45) Date of Patent: Aug. 7, 2018

(54) MULTI-RADIO WIRELESS LOCAL AREA NETWORK APPARATUS AND METHOD

(71) Applicant: Motorola Mobility, Chicago, IL (US)

(72) Inventors: Binesh Balasingh, Naperville, IL (US); Ranjeet Gupta, Chicago, IL (US); Mary Hor-Lao, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 150 days.

(21) Appl. No.: 15/219,234

(22) Filed: Jul. 25, 2016

(65) Prior Publication Data

US 2017/0290062 A1   Oct. 5, 2017

Related U.S. Application Data

(60) Provisional application No. 62/316,568, filed on Apr. 1, 2016.

(51) Int. Cl.
| H04W 4/00 | (2018.01) |
| H04W 74/08 | (2009.01) |
| H04W 74/00 | (2009.01) |
| H04W 84/12 | (2009.01) |

(52) U.S. Cl.
CPC ..... *H04W 74/0825* (2013.01); *H04W 74/004* (2013.01); *H04W 74/006* (2013.01); *H04W 84/12* (2013.01)

(58) Field of Classification Search
None
See application file for complete search history.

(56) References Cited

U.S. PATENT DOCUMENTS

| 7,363,051 | B2 * | 4/2008 | Bridgelall | H04L 29/06 455/41.2 |
| 8,675,544 | B1 * | 3/2014 | Hirsch | H04B 7/2656 370/322 |
| 8,773,969 | B1 * | 7/2014 | Zhang | H04L 27/2602 370/208 |
| 9,226,270 | B1 * | 12/2015 | Zhang | H04W 72/04 370/328 |
| 9,716,963 | B2 * | 7/2017 | Brisebois | H04W 4/001 370/328 |
| 2005/0215287 | A1 * | 9/2005 | Efland | H04B 1/406 455/562.1 |
| 2007/0171858 | A1 * | 7/2007 | Grandhi | H04W 74/002 370/328 |
| 2008/0084854 | A1 * | 4/2008 | Feder | H04N 21/4122 370/338 |
| 2009/0196210 | A1 * | 8/2009 | Desai | H04W 52/0225 370/311 |

(Continued)

*Primary Examiner* — Anh-Vu Ly
(74) *Attorney, Agent, or Firm* — Cygan Law Offices P.C.; Joseph T. Cygan

(57) ABSTRACT

An apparatus includes a first media access control (MAC) device comprising a first radio transceiver and having a first MAC address and a second MAC device comprising a second radio transceiver and having a second MAC address. The second MAC device is operatively coupled to the first MAC device. The first MAC device is operative to receive first MAC layer data for the first MAC device and receive second MAC layer data for the second MAC device, and transmit the first MAC layer data and the second MAC layer data to an access point (AP) using the first radio transceiver of the first MAC device.

20 Claims, 10 Drawing Sheets

(56) References Cited

U.S. PATENT DOCUMENTS

| | | | |
|---|---|---|---|
| 2009/0225669 A1* | 9/2009 | Qin | H04L 43/0864 370/249 |
| 2010/0165959 A1* | 7/2010 | Park | H04W 72/1215 370/338 |
| 2013/0225068 A1* | 8/2013 | Kiminki | H04W 52/0216 455/39 |
| 2013/0308691 A1* | 11/2013 | Sturkovich | H04L 27/34 375/222 |
| 2014/0241183 A1* | 8/2014 | Comeau | H04L 5/0098 370/252 |
| 2015/0131752 A1* | 5/2015 | Harel | H04B 7/0871 375/267 |
| 2016/0029385 A1* | 1/2016 | Shapira | H04B 1/401 370/329 |
| 2016/0081010 A1* | 3/2016 | Seok | H04W 74/0816 370/329 |
| 2016/0150429 A1* | 5/2016 | Chang | H04L 47/27 370/338 |
| 2016/0241312 A1* | 8/2016 | Amini | H04W 74/02 370/338 |
| 2016/0262184 A1* | 9/2016 | Wentink | H04L 67/04 370/338 |
| 2016/0360443 A1* | 12/2016 | Hedayat | H04B 7/0452 370/338 |
| 2017/0006542 A1* | 1/2017 | Huang | H04W 52/0209 370/338 |
| 2017/0006608 A1* | 1/2017 | Josiam | H04W 72/0453 370/338 |
| 2017/0006635 A1* | 1/2017 | Huang | H04W 74/0816 370/338 |
| 2017/0118696 A1* | 4/2017 | Seok | H04W 48/08 370/338 |
| 2017/0289097 A1* | 10/2017 | Balasingh | H04L 61/2007 370/338 |

* cited by examiner

- PRIOR ART -

- PRIOR ART -

- PRIOR ART -

MULTI-RADIO WIRELESS LOCAL AREA NETWORK APPARATUS AND METHOD

CROSS-REFERENCE TO RELATED APPLICATIONS

The present application claims priority to U.S. Provisional Patent Application No. 62/316,568, filed Apr. 1, 2016, entitled "MULTI-RADIO WIRELESS LOCAL AREA NETWORK APPARATUS AND METHOD" which is hereby incorporated by reference herein in its entirety, and which is assigned to the same assignee as the present application.

FIELD OF THE DISCLOSURE

The present disclosure relates generally to wireless device communication using wireless local area network access points and more particularly to multi-radio wireless devices in communication with wireless local area network access points.

BACKGROUND

The mobile phone industry is moving rapidly toward providing hardware upgradability for mobile device components. One likely upgrade may involve adding a second Wi-Fi® radio, or more, to improve wireless local area network (WLAN) connectivity and provide better performance. While adding a second, or even multiple, WLAN integrated circuits (ICs) to create parallel data paths for the mobile device may improve throughput, challenges exist in that independent radios must contend for the same medium at the Media Access Control (MAC) Layer and at the physical (PHY) layer.

An example known multiple radio system 100 is shown in FIG. 1. The multiple radio system 100 includes a processor 101 with a first network interface 102 that uses a first MAC address and a second network interface 105 that uses a second MAC address. The network interfaces are software access points to the processor 101. A first radio system, WLAN subsystem 1 104, includes WLAN hardware, a WLAN subsystem 1 driver and interfaces with an antenna system. A second radio system, WLAN subsystem 2 107, also includes WLAN hardware, a WLAN subsystem 2 driver and may interface with the same antenna system as first radio system, or may have a separate antenna system. In either case, the WLAN subsystem 1 104 MAC Layer sends data transmissions 103 and also receives data via the network interface 102. The second radio system, WLAN subsystem 2 107 MAC layer similarly sends data transmissions 106 and also receives data via the network interface 105. The data transmissions 103 and data transmissions 106 are in contention at the MAC Layer and at the PHY layer in the wireless medium access, based on the backoff algorithm.

A timing diagram 200 in FIG. 2 provides an example of a parallel WLAN data stream for two radio transmitters (Tx 1 and Tx 2) that employs a Request-to-Send/Clear-to-Send (RTS/CTS) mechanism which is used to prevent the hidden node problem. The operations implemented in timing diagram 200 comply with IEEE 802.11 requirements. As shown, when the first radio transmitter (Tx 1) is ready to send data, an RTS packet is sent to the WLAN Access Point (AP). The transmitter Tx 1 must wait to receive the CTS before it begins to send data. After the data transmission is completed, the AP sends an acknowledgement (ACK) to Tx 1. The second transmitter Tx 2 must wait until the first transmitter receives it ACK (the "backoff" period), the DCF Interframe Space (DIFS) and a random backoff time before it sends its own RTS. Further delay time is added by the Short Interframe Space (SIFS) until the CTS is received and a second SIFS prior to the second transmitter Tx 2 being able to transmit data. As can be seen from the illustration of FIG. 2, Tx 2 must wait for Tx 1 to complete its transmission before Tx 2 can request a Network Allocation Vector (NAV Request) via an RTS. FIG. 3 illustrates an example scenario in which RTS/CTS is not used under the assumption that the hidden node problem is not an issue. The operations implemented in timing diagram 300 also comply with IEEE 802.11 requirements. As can be seen in FIG. 3, the second transmitter Tx 2 must wait for a minimum of the SIFS, a DIFS, and a Random Backoff duration before Tx 2 has an opportunity to transmit data. Therefore the second transmitter faces quite a long delay before it is able to engage in sending any data.

DETAILED DESCRIPTION

Figure 1:
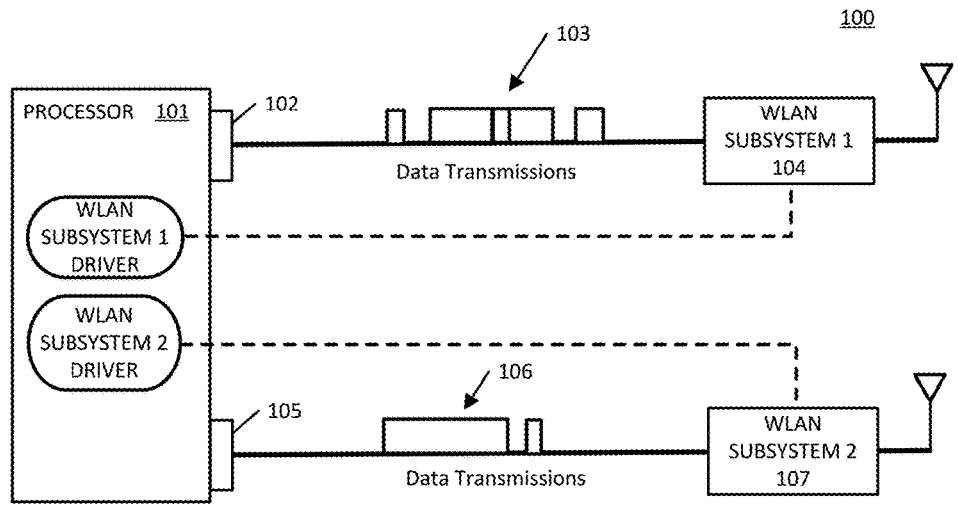
FIG. 1 is a block diagram of a known dual radio system for wireless local area network access with the two radio systems being in contention.

Briefly, the disclosed embodiments provide apparatuses and methods of operation that enable cooperative utilization of two or more wireless local area network (WLAN) MAC devices (such as a WLAN subsystem), each having its own distinct MAC address, in a single wireless device such as mobile phone (i.e. smartphone), a laptop computer, desktop computer, tablet, etc. The disclosed embodiments handle contention issues between the various MAC devices prior to radio transmission such that the data transmission delay that would otherwise be associated with handling these contention issues is reduced or eliminated.

The disclosed embodiments provide an apparatus that includes a first media access control (MAC) device that has a first radio transceiver and a first MAC address; and a second MAC device that has a second radio transceiver and a second MAC address. The second MAC device is operatively coupled to the first MAC device. The first MAC device is operative to receive first MAC layer data for the first MAC device and receive second MAC layer data for the second MAC device and transmit the first MAC layer data and the second MAC layer data to an access point (AP) using the first radio transceiver. The first radio transceiver is further operative to send a network allocation vector (NAV) request to the AP, for a NAV duration required to transmit the first MAC layer data and the second MAC layer data, and to transmit the first MAC layer data and the second MAC layer data to the AP within the NAV duration.

In one embodiment of the apparatus, the first radio transceiver is operative to listen for the distributed coordination function (DCF) interframe space (DIFS) interval, transmit the first MAC layer data to the AP after completion of the DIFS interval, and transmit the second MAC layer data to the AP after completion of transmission of the first MAC layer data without engagement of a DCF backoff algorithm by the second radio transceiver.

The disclosed embodiments further provide an apparatus that includes a first MAC device that has a first radio transceiver and a first MAC address, and a second MAC device that has a second radio transceiver and a second MAC address. The second MAC device is operatively coupled to the first MAC device. The first MAC device is operative to send a NAV request to an AP, for a NAV duration required to transmit first MAC layer data and the second MAC layer data, and transmit the first MAC layer data. The second MAC device is operative to transmit the second MAC layer data to the AP within the remainder of the NAV duration, after the first MAC device completes transmission of the first MAC layer data. The first radio transceiver is also operative to listen for the DIFS interval, and transmit the first MAC layer data to the AP after completion of the DIFS interval. The second radio transceiver is operative to transmit the second MAC layer data to the AP after completion of transmission of the first MAC layer data by the first radio transceiver, without engagement of a DCF backoff algorithm by the second radio transceiver.

The disclosed embodiments further provide an apparatus that includes a first MAC device that has a first radio transceiver and a first MAC address, and a second MAC device that has a second radio transceiver and a second MAC address. That apparatus also includes MAC manager logic that is operatively coupled to the first MAC device and to the second MAC device. The MAC manager logic is operative to receive first MAC layer data for the first MAC device, receive second MAC layer data for the second MAC device, and determine which of the first radio transceiver or the second radio transceiver transmits data to an AP.

In some embodiments, the MAC manager logic is operative to determine which of the first radio transceiver or the second radio transceiver transmits data to the AP by selecting a radio transceiver that has a lower packet error rate, a higher modulation and coding scheme index, a lower power consumption, or a lower transmission delay. In other embodiments, the MAC manager logic is further operative to perform a radio selection procedure to select either the first radio transceiver or the second radio transceiver to transmit the first MAC layer data and the second MAC layer data to the AP, and to transmit the first MAC layer data and the second MAC layer data to the AP using the selected radio transceiver.

In some embodiments, the MAC manager logic is operative to perform the radio selection procedure by obtaining the packet error rate, modulation and coding scheme index, power consumption requirement, and transmission delay for the first radio transceiver and the second radio transceiver and applying weighting factors to the packet error rate, modulation and coding scheme index, power consumption requirement, and transmission delay for the first radio transceiver and the second radio transceiver to obtain evaluation values for the first radio transceiver and the second radio transceiver. The MAC manager logic compares the evaluation values to select either the first radio transceiver or the second radio transceiver.

In some embodiments, the MAC manager logic is further operative to control the first radio transceiver to send a NAV request to the AP. The MAC manager logic may be further operative to determine the NAV duration requested by the first radio transceiver. For example, the MAC manager logic may be operative to determine the NAV duration required to transmit the first MAC layer data for the first MAC device and second MAC layer data for the second MAC device.

In one embodiment, the MAC manager logic is further operative to control the first radio transceiver to transmit the first MAC layer data to the AP, and to transmit the second MAC layer to the AP within the remainder of the NAV interval after completion of transmitting the first MAC layer data.

In another embodiment, the MAC manager logic is further operative to control the first radio transceiver to send the first MAC layer data to the AP, and control the second radio transceiver to send the second MAC layer to the AP within the remainder of the NAV interval after the first radio transceiver completes transmission the first MAC layer data.

In some embodiments, the MAC manager logic is further operative to control the first radio transceiver to transmit the first MAC layer data to the AP, and control the second radio transceiver to transmit the second MAC layer to the AP without engagement of a DCF backoff algorithm by the second radio transceiver. In some embodiments, MAC manager logic is further operative to control the first radio transceiver to transmit the first MAC layer data to the AP, and to transmit the second MAC layer data to the AP after completion of transmitting the first MAC layer data.

The apparatus may further include a processor that is operatively coupled to the MAC manager logic, where the processor provides a first network interface for the first MAC device and a second network interface for the second MAC device. The MAC manager logic is further operative to multiplex portions of the first MAC layer data with portions of the second MAC layer data to assemble an MSDU (MAC service data unit) for transmission to the AP by either the first radio transceiver or the second radio transceiver. The MAC manager logic is further operative to determine the highest modulation and coding scheme (MCS) index supported by the first radio transceiver and the second radio transceiver, and control the first radio transceiver and the second radio transceiver to use the highest supported MCS for communication with the AP. The MAC manager logic is further operative to determine the packet error rate for the first radio transceiver and the second radio transceiver, and determine which of the first radio transceiver or the second radio transceiver transmits data to the AP by selecting the radio transceiver having the lower packet error rate. The operations implemented in accordance with the embodiments comply with IEEE 802.11 requirements for WLAN communication.

Figure 4:
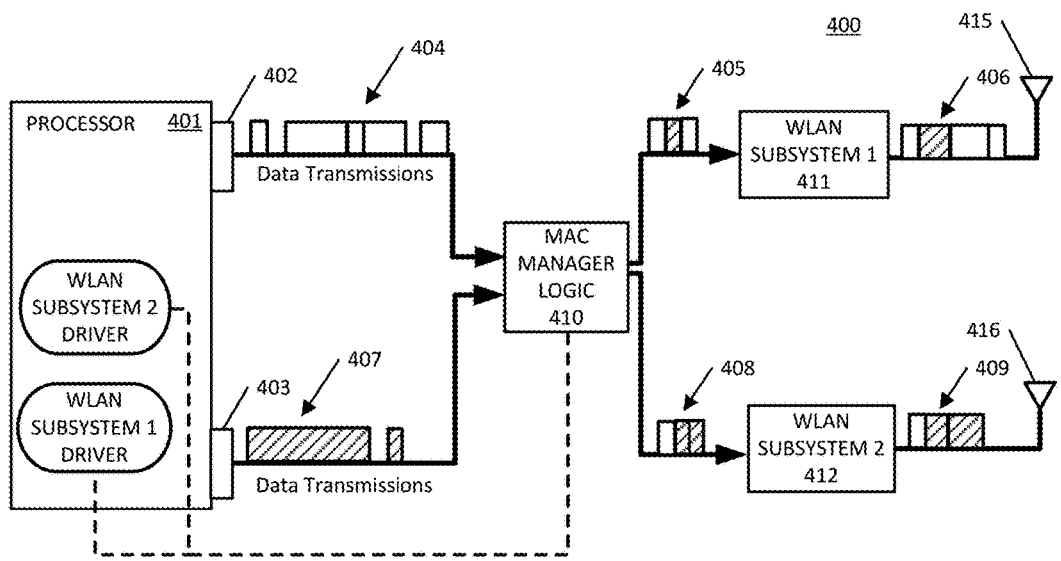
FIG. 4 is a block diagram of a dual radio system having two network interfaces to a processor in accordance with an embodiment.

Turning now to FIG. 4, a block diagram of a dual radio system 400 is shown having two network interfaces to a processor 401 in accordance with an embodiment. The dual radio system 400 may be incorporated into a device such as, but not limited to, a mobile phone (i.e. smartphone), a laptop computer, desktop computer, tablet, etc. A first WLAN subsystem 411 is operatively coupled to one or more antennas 415 and includes a first WLAN subsystem driver. A second WLAN subsystem 412 is operatively coupled to one or more antennas 416 and includes a second WLAN subsystem driver. The first and second WLAN subsystem drivers may be executed by the processor 401. The processor 401 implements a first network interface 402 that uses a first MAC address and a second network interface 403 that uses a second MAC address for the first WLAN subsystem 411 and second WLAN subsystem 412, respectively. "MAC manager logic" 410 is operatively coupled to network interface 402 and network interface 403, and is operative to communicate with, and control, the first WLAN subsystem 411 driver and the second WLAN subsystem 412 driver.

The MAC manager logic 410 is operative to control multiple MAC layers that are available for the dual radio system 400 to transmit data. Although the example embodiment of FIG. 4 shows two network interfaces and therefore two MAC addresses and two radios (i.e. two WLAN subsystems), the embodiments are not limited to two radios and therefore multiple radios and multiple MAC addresses may be used in various embodiments. In the example dual radio system 400, network interface 402 corresponding to a first MAC address may send first MAC layer data 404 to the MAC manager logic 410 while network interface 403 corresponding to a second MAC address sends second MAC layer data 407 to the MAC manager logic 410. The MAC manager logic 410 is operative to make decisions as to how first MAC layer data 404 and second MAC layer data 407 is allocated for transmission by the first radio transmitter 415 and the second radio transmitter 416. As shown in the example of FIG. 4, the MAC manager logic 410 can provide data 405 to the first WLAN subsystem 411 and data 408 to the second WLAN subsystem 412. The data 405 and data 408 include reallocated portions of first MAC layer data 404 and second MAC layer data 407. Therefore the first WLAN subsystem 411 will transmit data 406 which includes portions of first MAC layer data 404 from the first MAC address and portions of second MAC layer data 407 from the second MAC address. Likewise the second WLAN subsystem 412 will transmit data 409 which also includes portions of first MAC layer data 404 from the first MAC address and portions of second MAC layer data 407 from the second MAC address.

Figure 5:
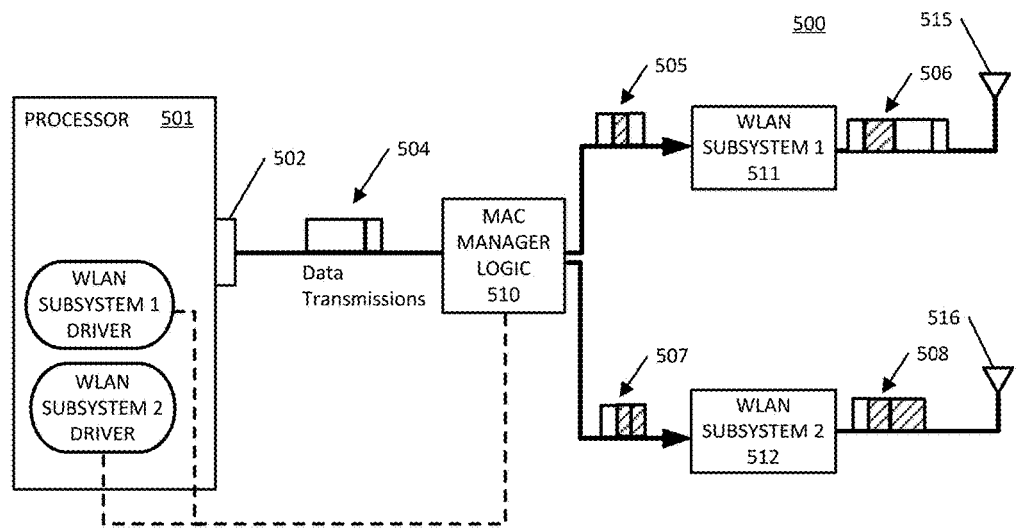
FIG. 5 is a block diagram of a dual radio system having a single network interface to a processor in accordance with an embodiment.

The MAC manager logic may also operate on a single network interface based system such as the dual radio system 500 depicted in FIG. 5. In the dual radio system 500, a processor 501 has a single network interface 502 corresponding to a single MAC address in accordance with an embodiment. The dual radio system 500 may be incorporated into a device such as, but not limited to, a mobile phone (i.e. smartphone), a laptop computer, desktop computer, tablet, etc. A first WLAN subsystem 511 is operatively coupled to one or more antennas 515 and includes a first WLAN subsystem driver. A second WLAN subsystem 512 is operatively coupled to one or more antennas 516 and includes a second WLAN subsystem driver. The first and second WLAN subsystem drivers may be executed by a processor 501. "MAC manager logic" 510 is operatively coupled to the network interface 502, and is operative to communicate with, and control, the first WLAN subsystem 511 driver and the second WLAN subsystem 512 driver.

In the example dual radio system 500, network interface 502 may send data 504 to the MAC manager logic 510 which is operative to make decisions as to how data 504 is allocated for transmission by the first WLAN subsystem 511 and the second WLAN subsystem 512. The data 504 include first MAC layer data and second MAC layer data. As shown in the example of FIG. 5, the MAC manager logic 510 can provide data 505 to the first WLAN subsystem 511 and data 507 to the second WLAN subsystem 512. The data 505 and data 507 include portions of data 504 selected for transmission according to radio selection procedures of the embodiments. Therefore the first WLAN subsystem 511 will transmit data 506 and the second WLAN subsystem 512 will transmit data 508, where the data includes portions of data 504 reallocated using radio selection procedures.

In the examples of FIG. 4 and FIG. 5, the radio selection procedures implemented by the MAC manager logic use information from the WLAN subsystem radio transmitters along with information obtained from the WLAN subsystem MAC layers. The MAC manager logic receives, and is functionally aware of the MAC layer information of each of the attached physical/virtual MAC modules. More particularly, the MAC manager logic receives information and is aware of the following for each MAC attached: current MAC state (i.e. associated/authenticated/connected/disconnected); TSF (Timing Synchronization Function) sync information; PER (Packet Error Rate) and BER (Bit Error Rate) statistics; BSSID (basic service set identification) which is the MAC address of the wireless AP; RSSI (Received Signal Strength Indicator) to any connected BSSID; associated channel statistics; Tx MCS (Modulation and Coding Scheme) index; Current Contention Window; CCA (clear channel assessment) reports; Tx/Rx state; control frame distribution; PTK (Pairwise Transient Key) and GTK (Group Temporal Key); and MAC address. Further, the MAC manager logic is operative to control the following characteristics of each attached MAC: Tx Data; Tx instant; NAV request size; clock sync within TU (Time Unit; specified in 802.11 as 1024 µs) precision; the encryption key to be used for a current data frame; and the MAC address to be used for current data frame.

Regarding parallel radio transmission overhead, when the WLAN subsystem radios compete for airtime, the RTS/CTS mechanism is commonly employed to overcome the hidden node problem. Under this mechanism for known systems, two transmitters contending for a medium would implement transmission timing such as discussed in the example timing diagram 200 shown in FIG. 2. However, in some embodiments, a dual radio system may utilize RTS/CTS in a simplified manner by placing a single NAV Request for both radio transmitters together. The actual data transmission may then be performed by either radio. An example timing diagram 600 according to such an embodiment is shown in FIG. 6A.

The timing diagram 600 may be implemented by the example dual radio system 400 depicted in FIG. 4 or the example dual radio system 500 depicted in FIG. 5. The data transmission in timing diagram 600 may be accomplished using either one of the WLAN subsystem radios on a single channel and having either a common BSS (basic service set) or different BSS. Put another way, the first and second WLAN subsystem radio transmitters may be connected to the same or different APs. For purpose of the example in FIG. 6A, the first radio transmitter Tx 1 is assumed to be transmitting data. In operation, the MAC manager logic performs a data transfer from the second radio transmitter Tx 2 to the MAC driver of the first radio transmitter Tx 1. The MAC manager logic also performs a radio selection procedure in order to decide that Tx 1, rather than Tx 2, will be used to transmit.

After selecting first radio transmitter Tx 1 for transmission, the MAC manager logic sends the Tx 1 WLAN subsystem the data buffer of the second WLAN subsystem radio transmitter Tx 2. In response, the first radio transmitter Tx 1 performs an NAV request (beginning with an RTS) for the total duration required to transmit the Tx 1 data and the Tx 2 data. Upon receiving the CTS, the first radio transmitter Tx 1 transmits data packets for itself and also on behalf of the second radio transmitter Tx 2.

Figure 2:
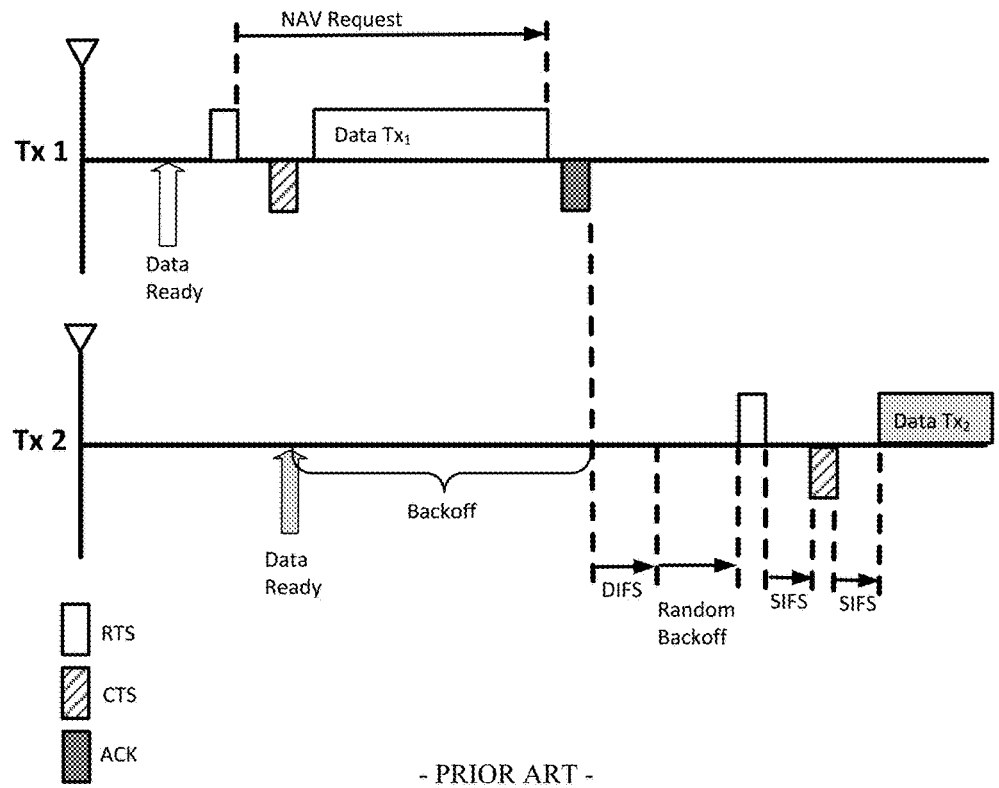
FIG. 2 is a timing diagram for a dual radio system such as shown in FIG. 1, where the two radio systems are in contention and utilize a Request-to-Send/Clear-to-Send (RTS/CTS) mechanism which causes delay in transmission for one of the radio systems.
Figure 6A:
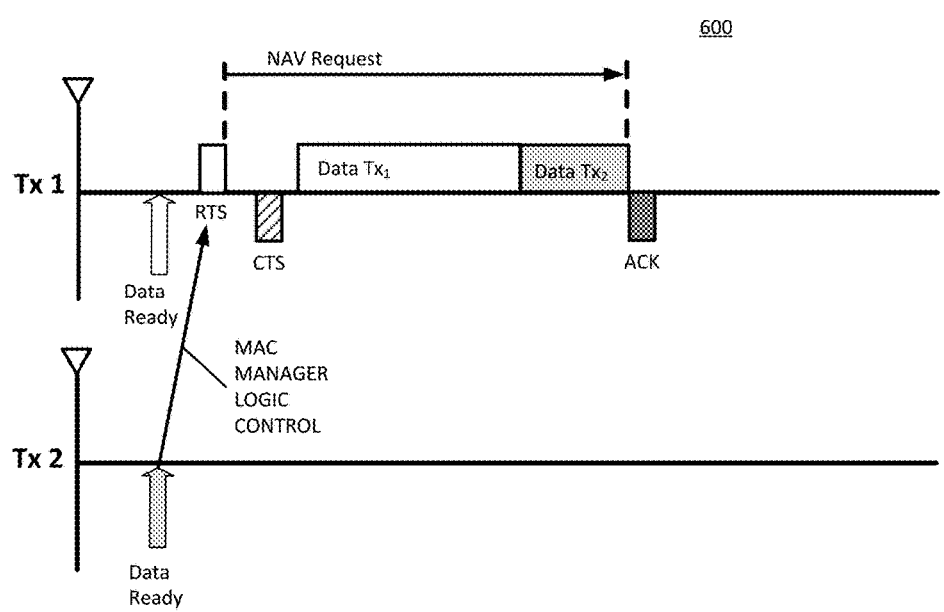
FIG. 6A is a timing diagram for a dual radio system in accordance with an embodiment.

By performing the MAC manager logic data transfer operation exemplified in FIG. 6A, the second radio transmitter's data transmission is scheduled earlier than would have been in the prior system example shown in FIG. 2, by a time duration equal to the DIFS duration, plus twice the SIFS duration, plus the Random Backoff time. Therefore, as long as the time required to send the data from both Tx 1 and Tx 2 combined is less than $2^{16}$ TUs, then a single RTS/CTS request can suffice to perform the required NAV reservation. In situations with larger data requirements where an additional NAV Request is required, the MAC manager logic will perform the radio transmitter selection procedure again to select which radio transmitter will send data during the transmission interval. In other words, the first radio transmitter or the second radio transmitter may be selected to transmit for the second NAV interval.

Figure 6B:
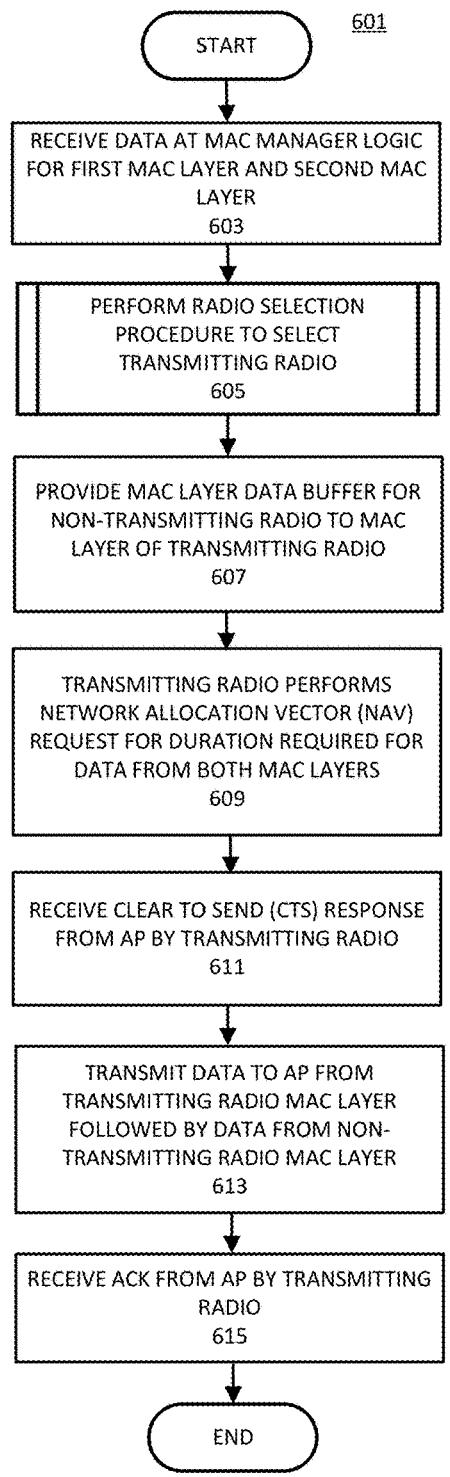
FIG. 6B is a flowchart illustrating operation of a MAC manager logic in accordance with the timing diagram of FIG. 6A.

FIG. 6B is a flowchart illustrating the MAC manager logic transmission control operation 601 in accordance with the timing diagram of FIG. 6A. In operation block 603, the MAC manager logic receives data from the first MAC layer and the second MAC layer. In operation block 605, the MAC manager logic performs a radio selection procedure to select the transmitting radio. In operation block 607, the MAC manager logic provides the MAC layer data buffer for the non-transmitting radio to the MAC layer of the transmitting radio (i.e. the radio selected to transmit). In operation block 609, the transmitting radio performs a NAV request for the duration required for data from both MAC layers. In operation block 611, the transmitting radio receives the CTS response from the AP. In operation block 613, the transmitting radio transmits data to the AP from the first MAC layer followed by data from the second MAC layer. In operation block 615, the transmitting radio receives the ACK from the AP and the method of operation terminates as shown.

Figure 7A:
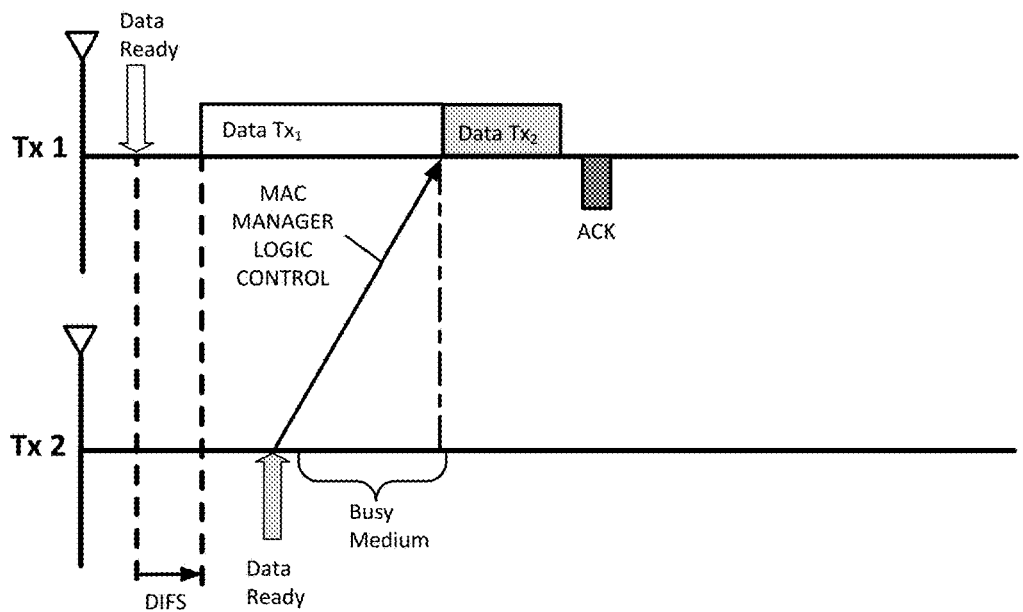
FIG. 7A is a timing diagram for a dual radio system in accordance with an embodiment.

FIG. 7A shows an example timing diagram 700 for a dual radio system in accordance with an embodiment that does not use the RTS/CTS mechanism. For known systems not utilizing RTS/CTS, two transmitters contending for a medium would implement transmission timing such as discussed in the example timing diagram 300 shown in FIG. 3. In contrast to the known system timing diagram 300, in some embodiments, a dual radio system may perform the scheme according to timing diagram 700. The timing diagram 700 may be implemented by the example dual radio system 400 depicted in FIG. 4 or the example dual radio system 500 depicted in FIG. 5. The data transmission in timing diagram 600 may be accomplished using either one of the radios on a single channel and having either a common AP or different APs. For purpose of the example in FIG. 7A, the first radio transmitter Tx 1 is assumed to be transmitting data. In operation, the MAC manager logic performs a data transfer from the second radio transmitter Tx 2 to the MAC driver of the first radio transmitter Tx 1. The MAC manager logic can make the decision of which radio transmitter should be used for the data transmission following the same radio selection procedure as used in the FIG. 6A example. In other words, the "Data $Tx_1$" and "Data $Tx_2$" could be reversed such that the first radio transmitter Tx 1 sends the second transmitter's MAC layer data if Tx 1 was better suited to perform the transmission based on radio frequency (RF) conditions and other considerations used by the MAC manager logic to select radios. Additionally, a radio transmitter may be preferred during the selection procedure based on its A-MSDU (Aggregate MAC Service Data Unit) capability. An A-MSDU enables multiple MSDUs to be concatenated in a single MPDU (MAC Protocol Data Unit).

In the example timing diagram 700, after selecting the first radio transmitter Tx 1 for transmission, the MAC manager logic sends the Tx 1 WLAN driver the data buffer of the second radio transmitter Tx 2. The MAC manager logic schedules the second radio transmitter Tx 2 data for transmission immediately after the Tx 1 data transmission is completed. In the case of an A-MSDU transmission, the duration field of the last fragment of the first radio transmitter's data is modified by the MAC manager logic to account for the additional NAV required for transmission of the second radio transmitter's data. The maximum A-MSDU aggregation is subject to an initial MSDU value negotiated between the AP and the radio transmitter that the MAC manager logic selects to perform the data transmission.

Figure 3:
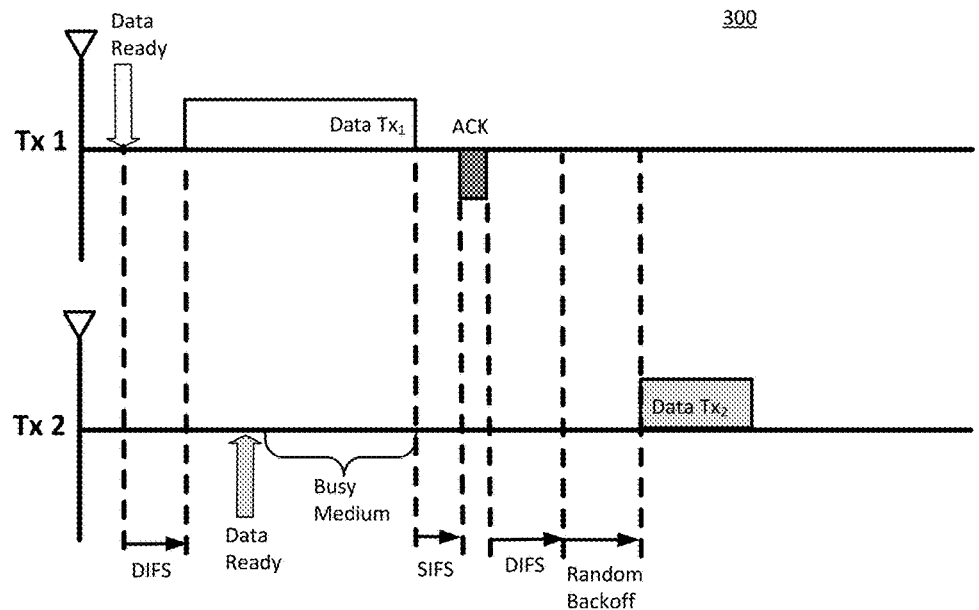
FIG. 3 is a timing diagram for a dual radio system such as shown in FIG. 1, where the two radio systems are in contention and do not utilize an RTS/CTS mechanism however still suffer delay in transmission for one of the radio systems.

By performing the MAC manager logic data transfer operation exemplified in FIG. 7A, the second radio transmitter's data transmission is scheduled earlier than would have been in the prior system example shown in FIG. 3, by a time duration equal to the DIFS duration, plus the SIFS duration, plus the Random Backoff time.

Figure 7B:
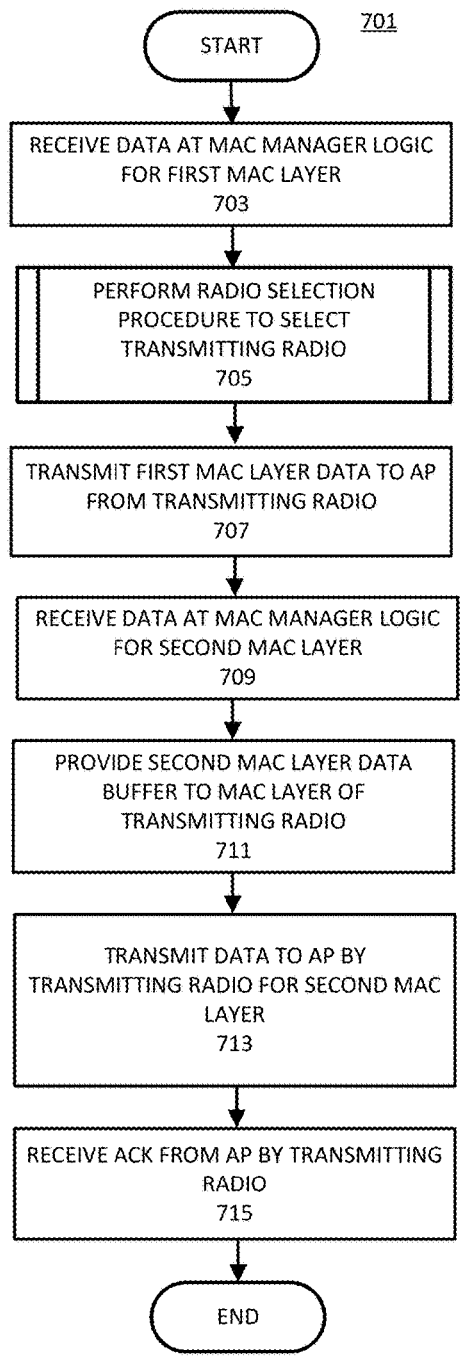
FIG. 7B is a flowchart illustrating operation of a MAC manager logic in accordance with the timing diagram of FIG. 7A.

FIG. 7B is a flowchart illustrating a MAC manager logic transmission control operation 701 in accordance with the timing diagram of FIG. 7A. In operation block 703, the MAC manager logic receives data for the first MAC layer. In operation block 705, the MAC manager logic performs the radio selection procedure to select the transmitting radio. For purposes of explanation, the transmitting radio is assumed to be the first radio transmitter (Tx 1) corresponding to the first MAC layer. However it is to be understood that either of the two radios could have been selected for the transmission and that data Tx 2 and data Tx 1 could have been sent in reverse order. In other words, the data ready from one MAC layer may be transmitted by the radio transmitter corresponding to another MAC layer.

In operation block 707, the transmitting radio transmits the first MAC layer data to the AP. In operation block 709, the MAC manager logic receives data for the second MAC layer and in operation block 711, provides the second MAC layer data buffer to the MAC layer of the transmitting radio. In operation block 713, the transmitting radio transmits data to the AP for the second MAC layer and receives an acknowledgment from the AP in operation block 715. The method of operation then terminates as shown.

The example timing diagram 700 and example timing diagram 800 addresses scenarios in which a single radio transmitter is used to transmit data on behalf of both the first radio transmitter and the second radio transmitter. In accordance with the embodiments, the MAC manager logic may coordinate data transmission using both radio transmitters. Example timing diagrams for using both radio transmitters are provided FIG. 8A and FIG. 9A. The example timing diagrams shown in FIG. 8A and FIG. 9A may be implemented by the example dual radio system 400 depicted in FIG. 4 or the example dual radio system 500 depicted in FIG. 5. FIG. 8A provides an example using the RTS/CTS mechanism and FIG. 9A provides an example without using RTS/CTS. The data transmission in timing diagram 800 shown in FIG. 8A and in timing diagram 900 shown in FIG. 9A may be accomplished using both radio transmitters on a single channel and having either a common AP or different APs connected to each radio transmitter.

In timing diagram 800 shown in FIG. 8A, the MAC manager logic performs a transmission control operation using the first radio transmitter and the second radio transmitter. Some embodiments will not perform any radio transmitter selection procedure because both radio transmitters are being utilized. However, in other embodiments, the radio selection procedure will be used to select whether the first radio transmitter or the second radio transmitter is used to send the NAV request. Further in other embodiments, the radio transmitter selection procedure will be performed by the MAC manager logic to decide whether to use a dual radio transmission operation as shown if FIG. 8A and FIG. 9A, or whether to proceed using a single radio transmission operation as was discussed with respect to FIG. 6A and FIG. 7A. In other words, in some embodiments, the MAC manager logic may switch between dual radio transmission operation or single radio transmission operation on an MSDU by MSDU basis (or on an MPDU by MPDU basis) based upon choosing the best radio conditions available at a given point in time.

In timing diagram 800 operation, the MAC manager logic obtains an anticipated NAV time request from the second radio transmitter and controls the first radio transmitter such that the first radio transmitter sends a NAV request RTS for the duration required to transmit data from both the first radio transmitter and the second radio transmitter. After the first radio transmitter receives the CTS, the MAC manager logic informs the second radio transmitter the NAV interval (i.e. "start-of-NAV" and end-of-NAV') that can be used by second radio transmitter for data transmission. All control operations performed by the MAC manager logic are implemented by communicating with the network interfaces to the processor and with the WLAN subsystem drivers for each radio transmitter. The WLAN subsystem drivers provide MAC layer functionality for the WLAN subsystems and may be executed by a processor separate from the WLAN subsystem chipset.

Regarding the NAV interval, in some situations if the start-of-NAV conveyed to the second radio transmitter equals the end-of-NAV (i.e. end of the overall NAV requested by the first radio transmitter), then this implies that the first radio transmitter is still busy transmitting and has no bandwidth to accommodate the dynamic request from the second radio transmitter. In those situations, transmission by the second radio transmitter is postponed until the next cycle. In situations, where the NAV interval is insufficient for transmission of the second radio transmitter data, then the second radio transmitter data will be split into two data segments, such that a first data segment can be transmitted within the NAV requested by the first radio transmitter. The second data segment can then be scheduled for transmission during the next cycle. This scheduling is handled by the MAC manager logic.

In situations where the NAV interval is sufficient for transmission of the second radio transmitter data, then the second radio transmitter will transmit right after the first radio transmitter has completed its data transmission as shown in timing diagram 800. By performing the operation shown in timing diagram 800 of sending the NAV requirement for the second radio transmitter to the first radio transmitter to make the NAV request, the second radio transmitter is scheduled earlier than would be the case in the example of FIG. 2 by a period of time equal to the DIFS duration, plus twice the SIFS duration, plus the Random Backoff time.

Figure 8B:
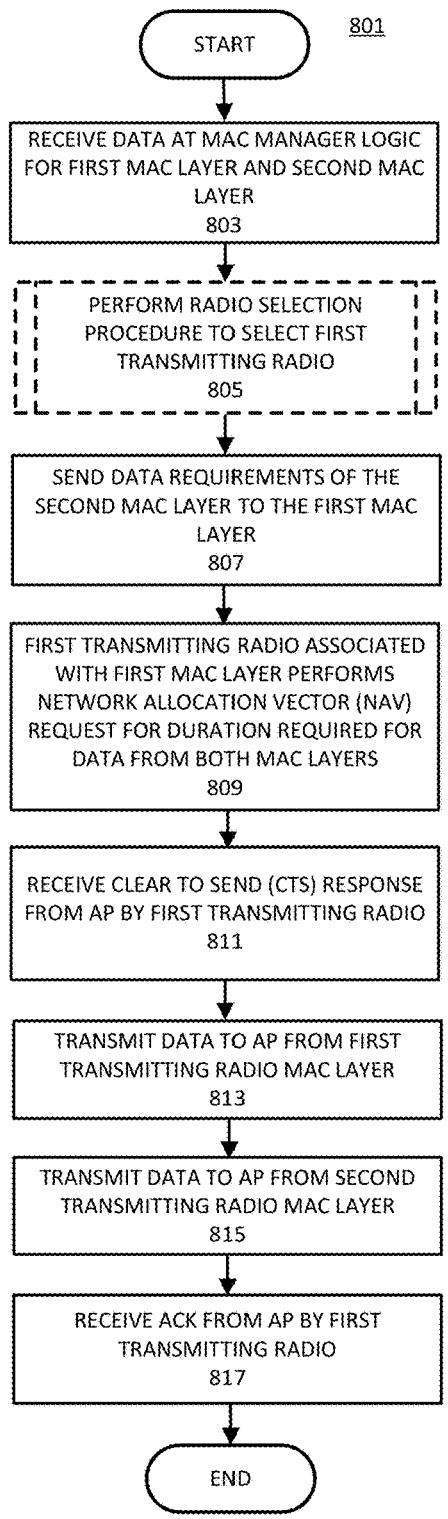
FIG. 8B is a flowchart illustrating operation of a MAC manager logic in accordance with the timing diagram of FIG. 8A.
Figure 8A:
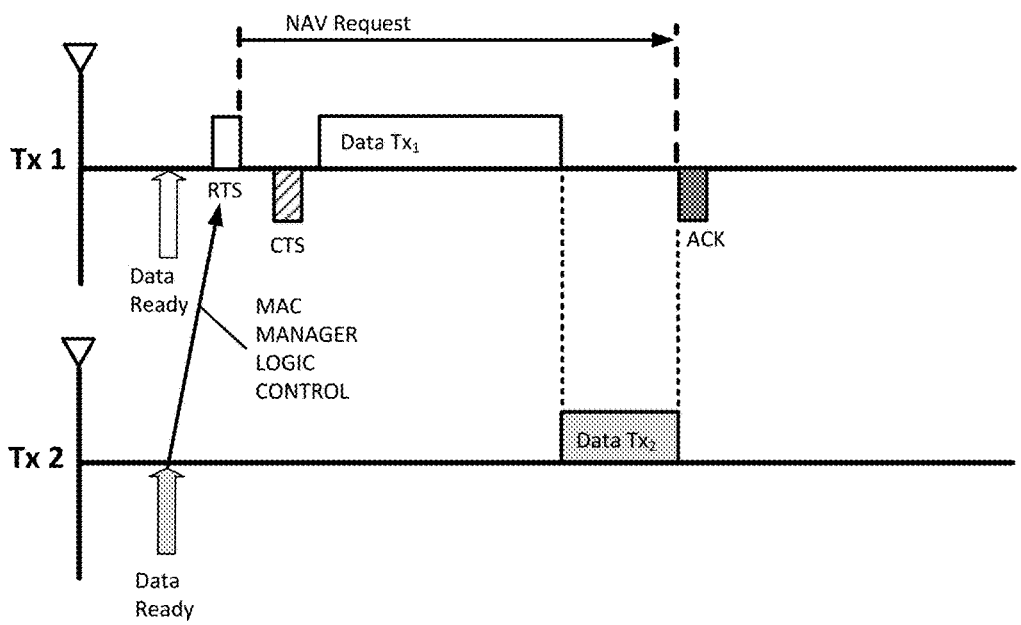
FIG. 8A is a timing diagram for a dual radio system in accordance with an embodiment.

FIG. 8B is a flowchart illustrating a MAC manager logic transmission control operation 801 in accordance with the timing diagram of FIG. 8A. In operation block 803, the MAC manager logic receives data for the first MAC layer and the second MAC layer. Performing the radio selection procedure is optional, since both radio transmitters are utilized in the transmission operation. Thus in operation block 805, as an option, the MAC manager logic performs a radio selection procedure to select the first transmitting radio. In operation block 807, the MAC manager logic sends the second MAC layer data requirements to the first MAC layer. In operation block 809, the first transmitting radio associated with the first MAC layer sends the NAV request for a duration required for data from both MAC layers. In operation block 811, the first transmitting radio receives the CTS response from the AP. In operation block 813, the first transmitting radio transmits the first MAC layer data to the AP. In operation block 815, the second transmitting radio transmits data from the second MAC layer to the AP. In operation block 817, the first transmitting radio receives the act from the AP and the method of operation terminates as shown.

In timing diagram 900 shown in FIG. 9A, the MAC manager logic also performs a transmission control operation using the first radio transmitter and the second radio transmitter, but without using the RTS/CTS mechanism. In timing diagram 900 operation, the MAC manager logic sends the first radio transmitter WLAN subsystem the data buffer of the second radio transmitter. The MAC manager logic schedules the second radio transmitter data from transmission immediately after the first radio transmitter's data transmission is completed. This operation is similar to the operation described with respect to timing diagram 700 shown in FIG. 7A, however in timing diagram 900 the second radio transmitter transmits its own data rather than deferring that task to the first radio transmitter. Handling of A-MSDU transmission in timing diagram 900 is the same as described with respect to timing diagram 700. The second radio transmitter's scheduled transmission time in timing diagram 900 operations is also reduced in delay similar to that described in timing diagram 700 with the difference being that the second radio transmitter transmits its own data.

Figure 9B:
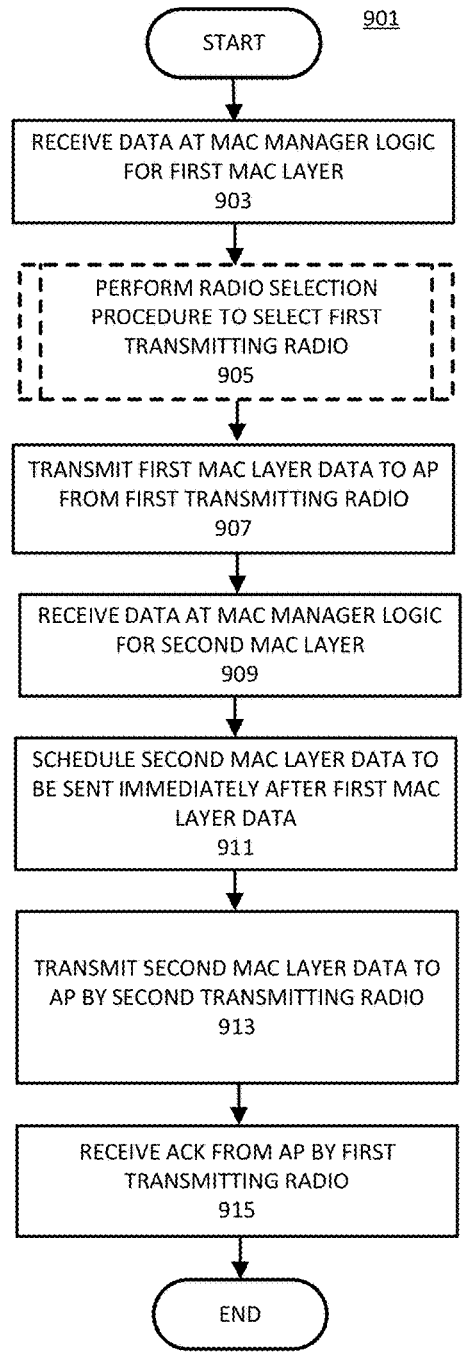
FIG. 9B is a flowchart illustrating operation of a MAC manager logic in accordance with the timing diagram of FIG. 9A.
Figure 9A:
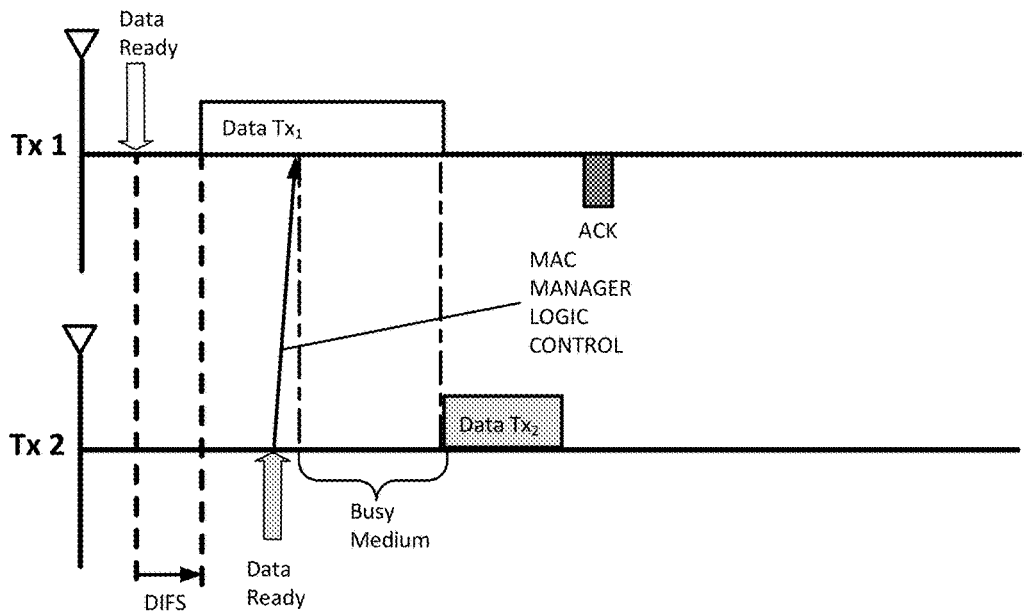
FIG. 9A is a timing diagram for a dual radio system in accordance with an embodiment.

FIG. 9B is a flowchart illustrating a MAC manager logic transmission control operation 901 in accordance with the timing diagram of FIG. 9A. In operation block 903, the MAC manager logic receives data for the first MAC layer. As an option, in operation block 905, the MAC manager logic may optionally perform the radio selection procedure to select the first transmitting radio. In operation block 907, the first transmitting radio transmits first MAC layer data to the AP. In operation block 909 the MAC manager logic receives data for the second MAC layer. In operation block 911, the MAC manager logic schedules the second MAC layer data to be sent immediately after the first MAC layer data. In operation block 913, the second transmitting radio transmits the second MAC layer data to the AP at the scheduled time scheduled by the MAC manager logic. In operation block 915, the first transmitting radio receives an ACK from the AP and the method of operation terminates as shown.

Figure 10:
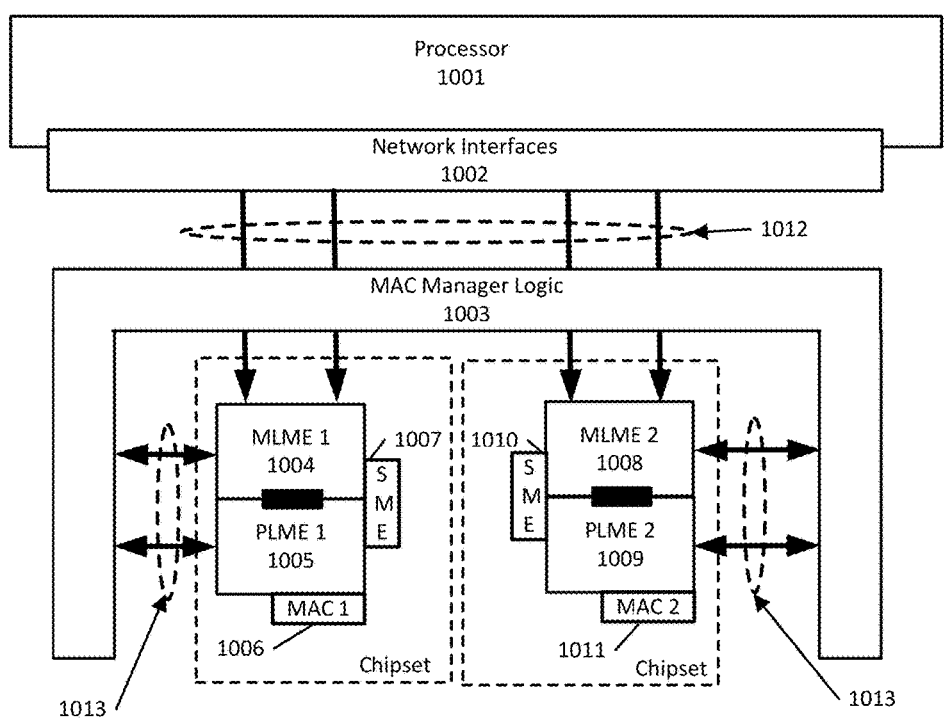
FIG. 10 is a block diagram of a dual radio system implementation in accordance with various embodiments.

A block diagram of an example apparatus 1000 incorporating MAC manager logic 1003 in accordance with an embodiment is shown in FIG. 10. The example apparatus 1000 supports multiple MAC devices (or i.e. multiple WLAN subsystems) and the MAC manager logic 1003 is operative to prioritize associated MSDU Data Frames across the multiple MAC devices. Because the apparatus 1000 supports two MAC "sublayers," where each MAC sublayer must comply with IEEE 802.11 wireless standards, each MAC device will have independent MLME (MAC sublayer management entity) and PLME (physical layer management entity) components. Because the two (or more) MAC sublayer components are collocated on the same apparatus, the MAC manager logic is placed to leverage the two MAC devices to best utilize the accessibility of the wireless medium. In the example apparatus 1000, a processor 1001 provides network interfaces 1002 which provide communication to the MAC manager logic 1003 and provide the MAC manager logic 1003 MAC layer information over an interface 1012. The processor 1001 may also execute the MAC device drivers.

The MAC devices each include an MLME 1004, 1008 and an operatively coupled PLME 1005, 1009. The first MAC device and second MAC device include an SME (station management entity) 1007 and SME 1010, respectively and a first MAC address 1006 and second MAC address 1011, respectively. The MLME 1004, PLME 1005, MLME 1008 and PLME 1009 are operatively coupled to the MAC manager logic 1003 to send and receive information over an interface 1013. The interface 1012 and interface 1013 may be an S-Link™ interface in some embodiments.

The MAC manager logic 1003 may be implemented in various ways in the embodiments. For example, in one example embodiment, the MAC manager logic 1003 may be implemented as executable instructions executed by one or more processors such as processor 1001 or a separate processor that is operatively coupled to the processor 1001. In other embodiments, the MAC manager logic 1003 may be implemented as hardware or as a combination of hardware and software/firmware. In embodiments implemented as software, or partially in software/firmware, the executable instructions may be stored in operatively coupled, non-volatile, non-transitory memory (not shown), that may be accessed by the one or more processors, such as processor 1001, as needed. The memory may be operatively coupled to the one or more processors, may be integrated therewith, or may be some combination of operatively coupled memory and integrated memory.

It is therefore to be understood that the MAC manager logic 1003 may be implemented as software or firmware (or a combination of software and firmware) executing on one or more processors, or using an ASIC (application-specific-integrated-circuit), DSP (digital signal processors), hard-wired circuitry (logic circuitry), state machines, an FPGA (field programmable gate array) or combinations thereof. Therefore, the example apparatus 1000 illustrated in FIG. 10 and described herein provides an example embodiment and is not to be construed as a limitation on the various other possible implementations that may be used in accordance with the various embodiments.

More particularly, in some embodiments the MAC manager logic 1003 shown in FIG. 10 may be an ASIC or FPGA operatively coupled to the first and second MAC devices by an S-Link™ interface or some other appropriate chip-to-chip communication interface. In another example embodiment, the MAC manager logic 1003 may be implemented together with one, or more, MAC devices compliant with IEEE 802 wireless standards in an SoC (system on a chip) configuration. In another example embodiment, the MAC manager logic 1003 may be implemented in a MAC device stackup as in a package-on-package (PoP) configuration. Further in some embodiments, the MAC manager logic 1003 may be a removable and replaceable mobile device component that includes only the MAC manager logic, or that is a SoC component that includes one MAC manager logic components and one, or more, MAC devices for IEEE 802 wireless operation and operative to communicate with additional external IEEE 802 MAC devices. These example embodiments and other embodiments are contemplated by the present disclosure.

Figure 11:
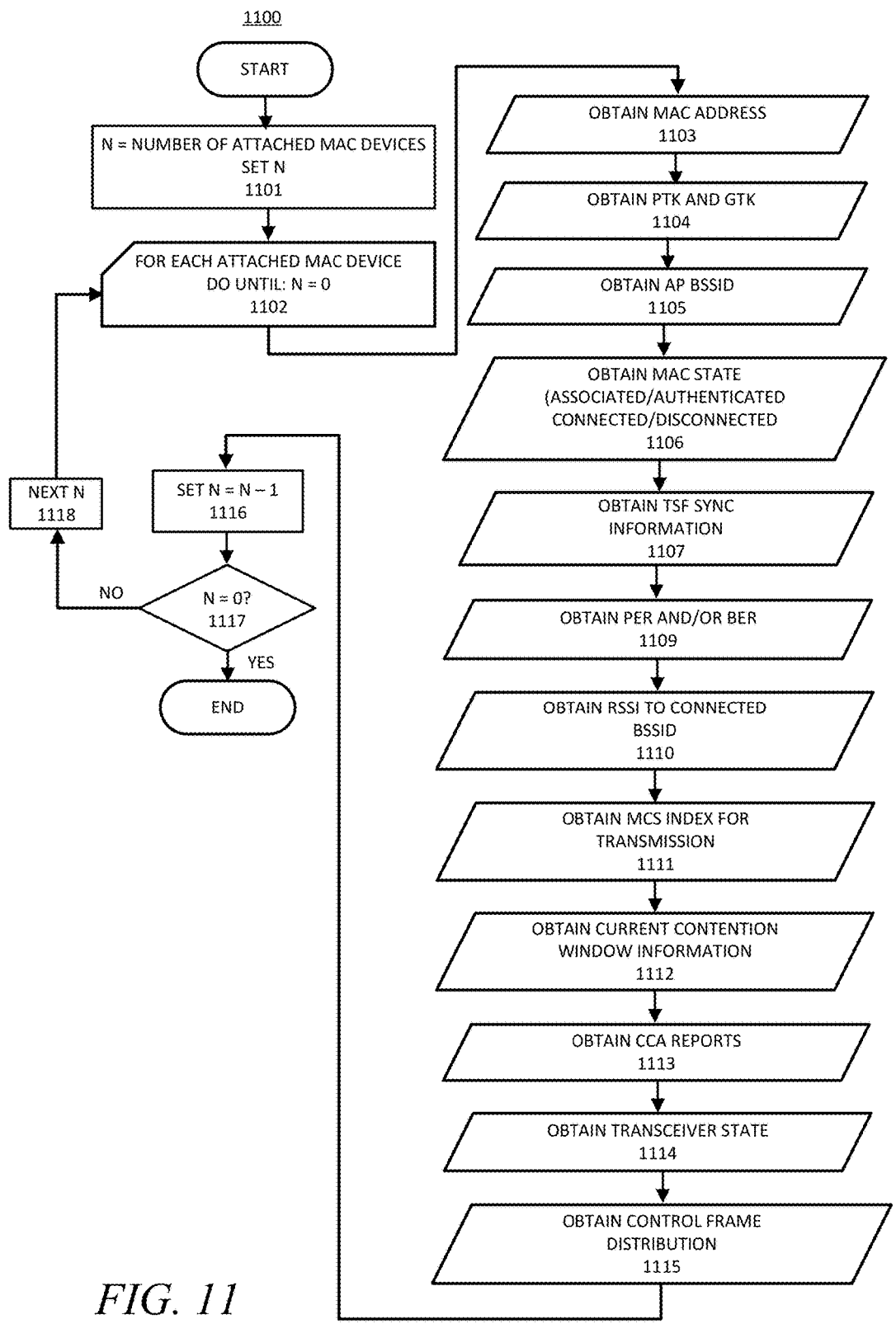
FIG. 11 is a flowchart showing an example data collection operation in accordance with various embodiments.
Figure 12:
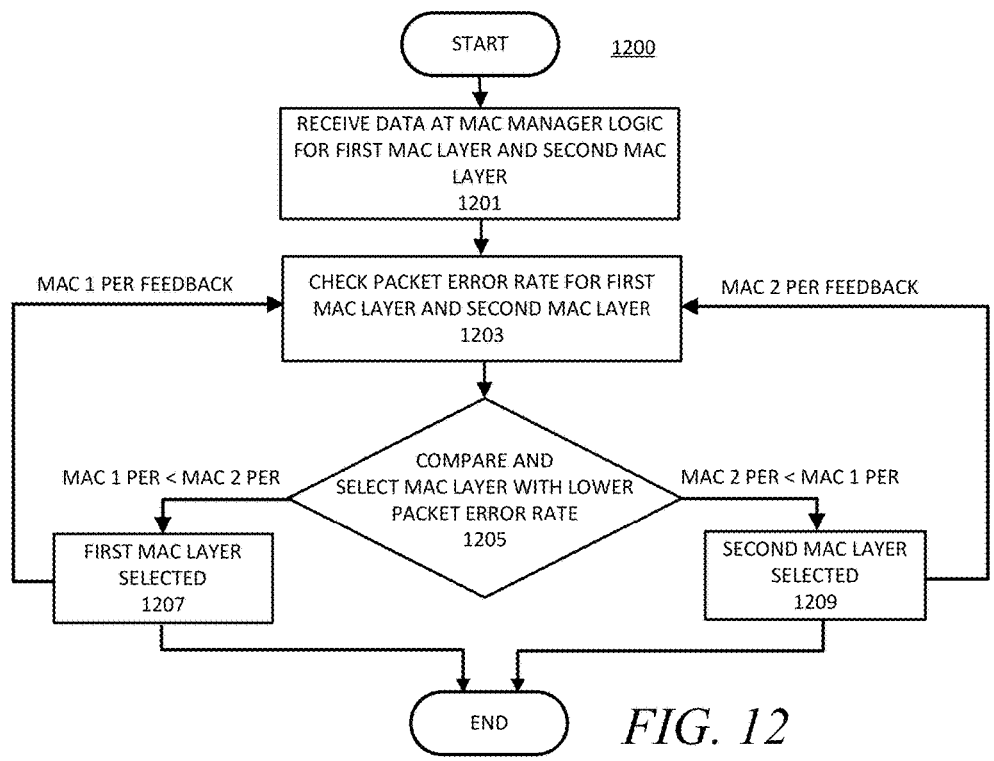
FIG. 12 is a flowchart showing an example radio selection procedure operation in accordance with various embodiments.

Examples of the radio selection procedures utilized by the MAC manager logic are illustrated in FIGS. 11 through 12. FIG. 11 is a flowchart showing an example data collection operation 1100 in accordance with various embodiments. The data collection operation 1100 shown in FIG. 11 is applicable for any number of radio transmitters and any number of MAC layers. Although the examples provided in the present disclosure are limited to two radio transmitters and two MAC layers for purposes of explanation, it is to be understood that the present disclosure is applicable to systems having any number of radios transmitters and MAC layers. In operation block 1101, the MAC manager logic begins data collection operation 1100 for any number of attached MAC devices. For each MAC device in operation block 1102, the MAC manager logic obtains: the MAC address 1103, the PGK and GTK 1104; the AP BSSID 1105; the MAC state (associated/authenticated/connected/disconnected) 1106; TSF sync information 1107; PER and/or BER 1109; RSSI to a connected BSSID 1110; MCS index for transmission 1111; current contention window information 1112; CCA reports 1113; transceiver state 1114; and control frame distribution 1115. In operation block 1116, the MAC manager logic increments the index counter for the looping operation and if the index does not equal zero in decision block 1117, then in operation block 1118 the MAC manager logic obtains data for the next MAC address. When data has been collected for all MAC addresses in decision block 1117, then the method of operation terminates as shown. It is to be understood that although the data collection operation 1100 is shown as a looping operation for purpose of explanation, the data may be collected dynamically and in parallel for each MAC address in various embodiments and is not limited to collecting data in any particular order or for any particular number of MAC addresses. In other words, the data collection operation 1100 may be performed in parallel for all MAC addresses and specific items of information may be collected in any particular order or in parallel. The data collection operation 1100 may be triggered based on various operational conditions. For example, the data collection operation 1100 may be invoked when any of the WLAN subsystem radios detect a change in any parameter, such as, but not limited to, PTK/GTK, PER, BER, RSSI, MCD IDX, CW, CCA, DIFS. A threshold value for any of these parameters may be set, that invokes the MAC manager logic to run the data collection operation 1100. The data collection operation 1100 may also be invoked upon detection of dynamic addition of a new radio (i.e. a new WLAN subsystem) by either the MAC manager logic or by an application layer system. Also, if the MAC manager logic does not receive a delta report from any of the WLAN subsystem radios for some preset period of time, of if one of the WLAN subsystem radios has a state change (i.e. connected, disconnected, associated, roaming), then the data collection operation 1100 may be invoked so that the MAC manager logic can reevaluate the radio conditions and make selections accordingly.

The term "MAC device" as used herein refers to a WLAN subsystem that includes a WLAN chipset having a radio transmitter and radio receiver (collectively "radio transceiver") and that has a corresponding MAC address and any related MAC layer capability. Some MAC layer capability may be implemented outside of the WLAN chipset in some embodiments, for example, by a WLAN subsystem driver executing on another processor and/or other WLAN related software and/or firmware etc. This external MAC layer software or firmware such as, but not limited to, the WLAN subsystem driver, is considered part of a "WLAN subsystem" and therefore part of a "MAC device" as these terms are used herein. The terms "radio," "radio transmitter," "radio transceiver," and/or "radio receiver" are used interchangeably herein to refer to IEEE 802 compliant hardware, such as the physical layer (PHY layer) capability provided by a WLAN chipset. As such, the apparatus 1000 shown in FIG. 10 may be considered to include two MAC devices (or two WLAN subsystems) as the terms are used herein. Each MAC device may be implemented as a chipset in some embodiments as indicated by the dotted lines in FIG. 10, including any required software or firmware such as, but not limited to, drivers executing on the processor 1001.

FIG. 12 is a flowchart showing an example radio selection procedure 1200 operation in accordance with some embodiments. In operation block 1201, the MAC manager logic receives data for the first MAC layer and the second MAC layer. In operation block 1203, the MAC manager logic checks the PER for the first MAC layer and the second MAC layer. In decision block 1205, the MAC manager logic compares the PER values and selects the MAC layer having the lower PER. If the first MAC layer PER is less than the second MAC layer PER then, in operation block 1207, the first MAC layer is selected. If the second MAC layer PER is less than the first MAC layer PER then, in operation block 1209, the second MAC layer is selected. After selection of the MAC layer the method of operation terminates as shown. The first MAC layer and the second MAC layer provide feedback to operation block 1203 and the operation in decision block 1205 may select a different MAC layer at various times upon changed conditions determined by the MAC layer PER feedback.

Figure 13:
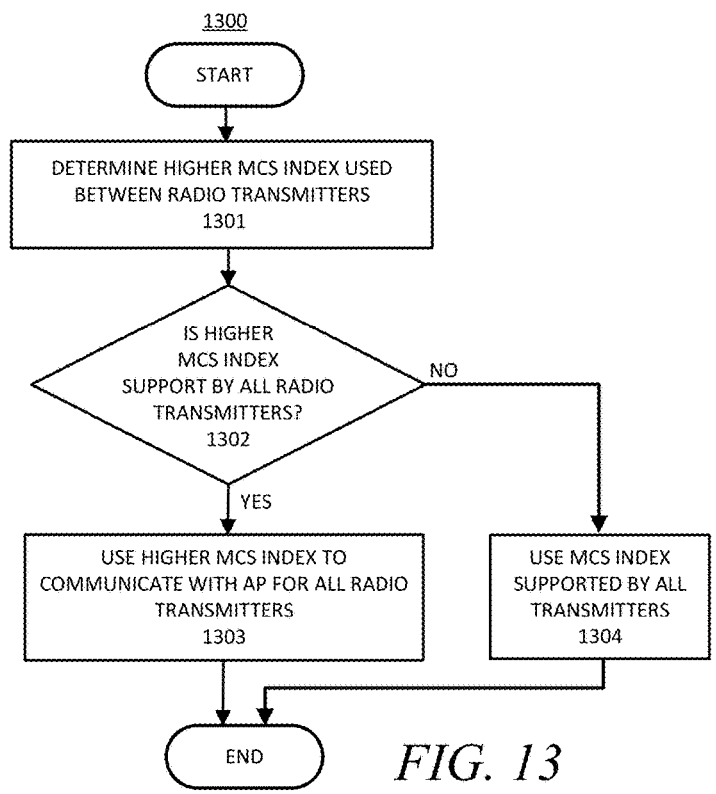
FIG. 13 is a flowchart showing an example MCS (modulation and coding scheme) selection procedure in accordance with an embodiment.

FIG. 13 is a flowchart showing an example MCS (modulation and coding scheme) selection procedure 1300 in accordance with an embodiment. In operation block 1301, the MAC manager logic determines the higher MCS index used between the various radio transmitters. In decision block 1302, the MAC manager logic determines if the higher MCS index is supported by all the radio transmitters. If not then, in operation block 1304, the MAC manager logic will select an MCS index that is supported by all transmitters and the method of operation will terminate as shown. However in decision block 1302, if the higher MCS index is supported by all radio transmitters then, in operation block 1303, the MAC manager logic will use the higher MCS index to communicate with the AP and this will be used by all radio transmitters. The method of operation then terminates as shown.

Figure 14:
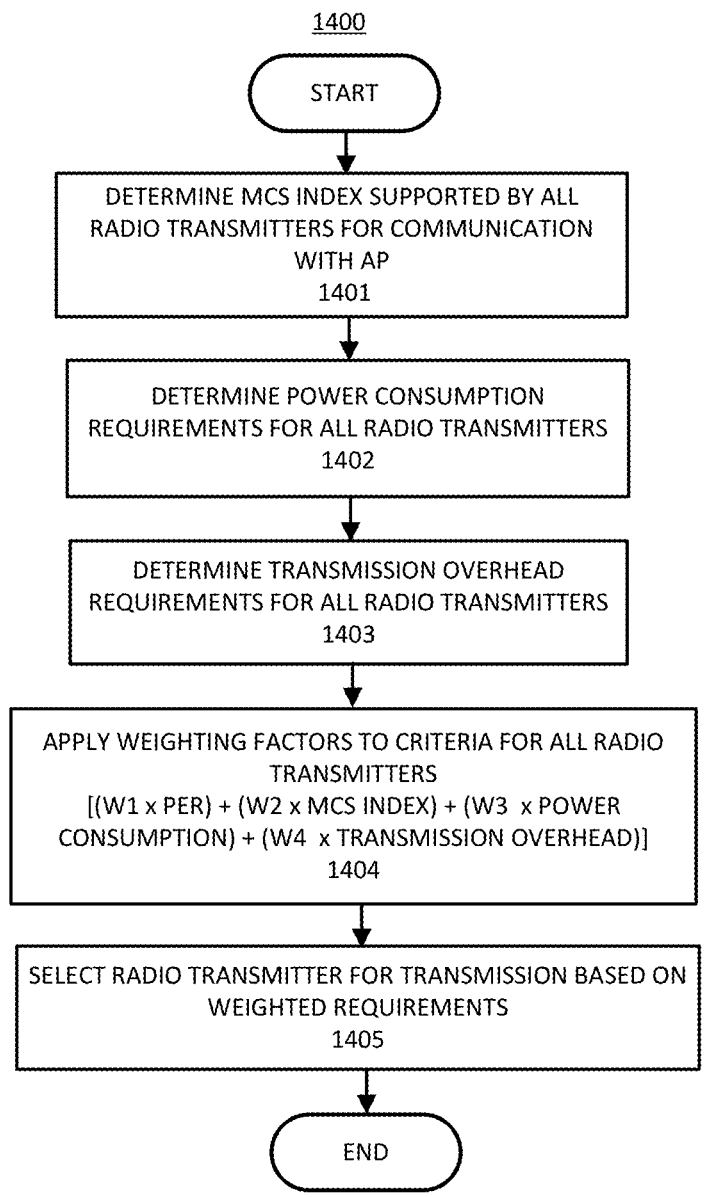
FIG. 14 is a flowchart showing an example radio selection procedure in accordance with an embodiment.

FIG. 14 is a flowchart showing an example radio selection procedure 1400 in accordance with an embodiment. In the radio selection procedure 1400, in operation block 1401, the MAC manager logic determines the MCS index supported by all radio transmitters for communication with the AP. In operation block 1402, the MAC manager logic determines power consumption requirements for all radio transmitters. In operation block 1403, the MAC manager logic determines the transmission overhead requirements for all radio transmitters. In operation block 1404, the MAC manager logic applies weighting factors to the criteria for each radio transmitter such that an overall evaluation value can be determined for each radio transmitter and such that the radio transmitters can be compared to one another to select the radio transmitter having the highest weighting. Therefore in operation block 1405, the MAC manager logic selects the radio transmitter for transmission based on the weighted requirements and the radio selection procedure 1400 terminates as shown.

The disclosed MAC manager logic therefore is operative to multiplex and/or collate MAC layer traffic and to switch between two or more MAC devices to control which MAC device/radio transmitter is actively transmitting data. As has been described above, these operations can be done both in the case of NAV reservation using RTS/CTS as well as in direct DCF based access (i.e. non RTS/CTS based). The operations disclosed illustrate that having a single MAC layer request for the duration of data from both MAC devices put together does away with mandatory inter-frame spacing wait times required when multiple independent MAC devices attempt to transmit. The disclosed embodiments therefore provide improved system efficiency when a single device such as a mobile phone, laptop computer, tablet, etc. has multiple MAC devices/WLAN subsystems.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:
1. An apparatus comprising:
 a first media access control (MAC) device comprising a first radio transceiver and having a first MAC address;
 a second MAC device comprising a second radio transceiver and having a second MAC address, the second MAC device operatively coupled to the first MAC device;
 the first MAC device operative to:
  receive first MAC layer data for the first MAC device and receive second MAC layer data for the second MAC device; and transmit the first MAC layer data and the second MAC layer data to an access point (AP) using the first radio transceiver of the first MAC device.

2. The apparatus of claim 1, wherein the first radio transceiver is further operative to:
send a network allocation vector (NAV) request to the AP, for a NAV duration required to transmit the first MAC layer data for the first MAC device and second MAC layer data for the second MAC device; and
transmit the first MAC layer data and the second MAC layer data to the AP within the NAV duration.

3. The apparatus of claim 1, wherein the first radio transceiver is operative to:
listen for a distributed coordination function (DCF) interframe space (DIFS) interval;
transmit the first MAC layer data to the AP after completion of the DIFS interval; and
transmit the second MAC layer data to the AP after completion of transmission of the first MAC layer data without engagement of a DCF backoff algorithm by the second radio transceiver.

4. An apparatus comprising:
a first media access control (MAC) device comprising a first radio transceiver and having a first MAC address;
a second MAC device comprising a second radio transceiver and having a second MAC address, the second MAC device operatively coupled to the first MAC device;
the first MAC device operative to:
send a network allocation vector (NAV) request to an access point (AP), for a NAV duration required to transmit first MAC layer data for the first MAC device and second MAC layer data for the second MAC device; and
transmit the first MAC layer data;
the second MAC device operative to:
transmit the second MAC layer data to the AP within the remainder of the NAV duration, after the first MAC device completes transmission of the first MAC layer data.

5. The apparatus of claim 4, wherein the first radio transceiver is operative to:
listen for a distributed coordination function (DCF) interframe space (DIFS) interval;
transmit the first MAC layer data to the AP after completion of the DIFS interval; and
wherein the second radio transceiver is operative to:
transmit the second MAC layer data to the AP after completion of transmission of the first MAC layer data by the first radio transceiver, without engagement of a DCF backoff algorithm by the second radio transceiver.

6. An apparatus comprising:
a first media access control (MAC) device comprising a first radio transceiver and having a first MAC address;
a second MAC device comprising a second radio transceiver and having a second MAC address; and
MAC manager logic, operatively coupled to the first MAC device and to the second MAC device, the MAC manager logic operative to:
receive first MAC layer data for the first MAC device and second MAC layer data for the second MAC device; and
determine which of the first radio transceiver or the second radio transceiver transmits data to an access point (AP).

7. The apparatus of claim 6, wherein the MAC manager logic is operative to determine which of the first radio transceiver or the second radio transceiver transmits data to the AP by selecting a radio transceiver meeting a characteristic selected from the list of: lower packet error rate, higher modulation and coding scheme index, lower power consumption, and lower transmission delay.

8. The apparatus of claim 6, wherein the MAC manager logic is further operative to:
perform a radio selection procedure to select either the first radio transceiver or the second radio transceiver to transmit the first MAC layer data and the second MAC layer data to the AP; and
transmit the first MAC layer data and the second MAC layer data to the access point using the selected radio transceiver.

9. The apparatus of claim 8, wherein the MAC manager logic is operative to perform the radio selection procedure comprising:
obtaining the packet error rate, modulation and coding scheme index, power consumption requirement, and transmission delay for the first radio transceiver and the second radio transceiver;
applying weighting factors to the packet error rate, modulation and coding scheme index, power consumption requirement, and transmission delay for the first radio transceiver and the second radio transceiver to obtain evaluation values for the first radio transceiver and the second radio transceiver; and
comparing the evaluation values to select either the first radio transceiver or the second radio transceiver.

10. The apparatus of claim 6, wherein the MAC manager logic is further operative to:
control the first radio transceiver to send a network allocation vector (NAV) request to the AP.

11. The apparatus of claim 10, wherein the MAC manager logic is further operative to:
determine an NAV duration requested by the first radio transceiver.

12. The apparatus of claim 11, wherein the MAC manager logic is further operative to:
determine the NAV duration required to transmit the first MAC layer data for the first MAC device and second MAC layer data for the second MAC device.

13. The apparatus of claim, 12 wherein the MAC manager logic is further operative to:
control the first radio transceiver to transmit the first MAC layer data to the AP, and to transmit the second MAC layer to the AP within the remainder of the NAV duration after completion of transmitting the first MAC layer data.

14. The apparatus of claim, 12 wherein the MAC manager logic is further operative to:
control the first radio transceiver to send the first MAC layer data to the AP; and
control the second radio transceiver to send the second MAC layer to the AP within the remainder of the NAV duration after the first radio transceiver completes transmission the first MAC layer data.

15. The apparatus of claim, 6 wherein the MAC manager logic is further operative to:
control the first radio transceiver to transmit the first MAC layer data to the AP; and
control the second radio transceiver to transmit the second MAC layer to the AP without engagement of a DCF backoff algorithm by the second radio transceiver.

16. The apparatus of claim, 6 wherein the MAC manager logic is further operative to:
control the first radio transceiver to transmit the first MAC layer data to the AP, and to transmit the second MAC layer data to the AP after completion of transmitting the first MAC layer data.

17. The apparatus of claim 6, further comprising:
a processor, operatively coupled to the MAC manager logic, the processor operative to provide a first network interface for the first MAC device and a second network interface for the second MAC device.

18. The apparatus of claim, 6 wherein the MAC manager logic is further operative to:
multiplex portions of the first MAC layer data with portions of the second MAC layer data to assemble a MAC service data unit (MSDU) for transmission to the AP by either the first radio transceiver or the second radio transceiver.

19. The apparatus of claim, 6 wherein the MAC manager logic is further operative to:
determine a highest modulation and coding scheme (MCS) index supported by the first radio transceiver and the second radio transceiver; and
control the first radio transceiver and the second radio transceiver to use the highest supported MCS for communication with the AP.

20. The apparatus of claim, 6 wherein the MAC manager logic is further operative to:
determine a packet error rate for the first radio transceiver and the second radio transceiver; and
determine which of the first radio transceiver or the second radio transceiver transmits data to the AP by selecting the radio transceiver having the lower packet error rate.

* * * * *